(12) United States Patent
Watanabe et al.

(10) Patent No.: US 9,343,096 B2
(45) Date of Patent: May 17, 2016

(54) PERPENDICULAR MAGNETIC RECORDING MEDIUM

(71) Applicant: Kabushiki Kaisha Toshiba, Minato-ku (JP)

(72) Inventors: Akira Watanabe, Kawasaki (JP); Takeshi Iwasaki, Inagi (JP); Kazutaka Takizawa, Kawasaki (JP); Kaori Kimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/193,239

(22) Filed: Feb. 28, 2014

(65) Prior Publication Data
US 2015/0154996 A1 Jun. 4, 2015

(30) Foreign Application Priority Data
Dec. 3, 2013 (JP) .................. 2013-250018

(51) Int. Cl.
*G11B 5/73* (2006.01)
*G11B 5/851* (2006.01)
*G11B 5/84* (2006.01)

(52) U.S. Cl.
CPC .............. *G11B 5/7325* (2013.01); *G11B 5/732* (2013.01); *G11B 5/8404* (2013.01); *G11B 5/851* (2013.01)

(58) Field of Classification Search
None
See application file for complete search history.

(56) References Cited

U.S. PATENT DOCUMENTS

| 6,730,421 | B1* | 5/2004 | Kirino et al. | 428/831.2 |
| 2003/0039862 | A1 | 2/2003 | Yoshida et al. | |
| 2005/0214520 | A1 | 9/2005 | Oikawa et al. | |
| 2006/0222902 | A1 | 10/2006 | Mukai | |
| 2009/0117410 | A1 | 5/2009 | Itoh et al. | |
| 2010/0209738 | A1 | 8/2010 | Itoh et al. | |
| 2013/0250453 | A1* | 9/2013 | Iwasaki | 360/99.08 |
| 2014/0234665 | A1* | 8/2014 | Gurney | G11B 5/66 428/828 |

FOREIGN PATENT DOCUMENTS

| JP | 2003-59034 | 2/2003 |
| JP | 2004-47052 | 2/2004 |
| JP | 2005-276365 | 10/2005 |
| JP | 2006-309919 | 11/2006 |
| WO | WO 2005/081233 A1 | 9/2005 |

* cited by examiner

*Primary Examiner* — Kevin Bernatz
(74) *Attorney, Agent, or Firm* — Oblon, McClelland, Maier & Neustadt, L.L.P

(57) ABSTRACT

According to one embodiment, a perpendicular magnetic recording medium is provided, which includes a non-magnetic granular underlayer formed on a substrate and containing metal grains of a first metal and a grain boundary layer surrounding the metal grains, each metal grain including a projection projecting from the boundary layer and a bottom portion embedded in the grain boundary layer, and a contact angle of the edge of the projection to the surface of the grain boundary layer being 45° to 85°, a non-magnetic intermediate layer formed on a surface of each projection and a magnetic recording layer having a projection pattern formed on the basis of a pattern of the projections in the non-magnetic intermediate layer via the non-magnetic intermediate layer.

13 Claims, 2 Drawing Sheets

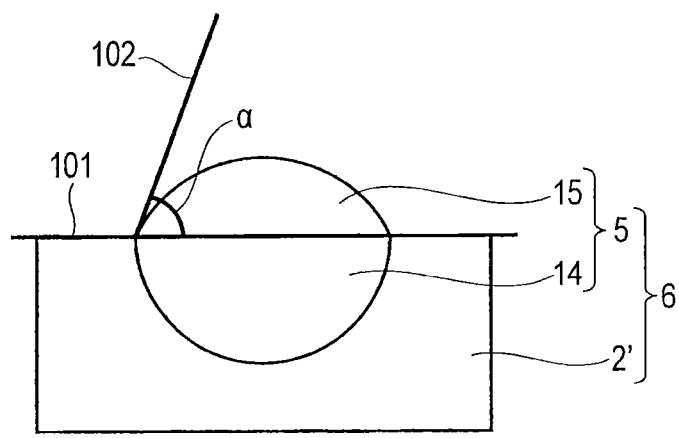
F I G. 1
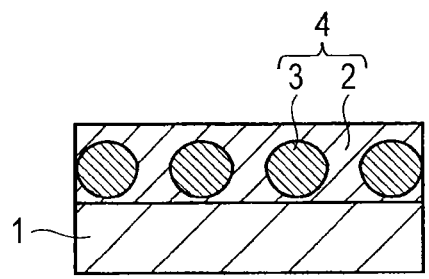
F I G. 2A
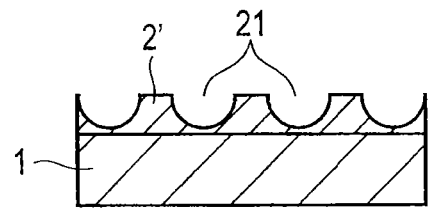
F I G. 2B

PERPENDICULAR MAGNETIC RECORDING MEDIUM

CROSS-REFERENCE TO RELATED APPLICATIONS

This application is based upon and claims the benefit of priority from Japanese Patent Application No. 2013-250018, filed Dec. 3, 2013, the entire contents of which are incorporated herein by reference.

FIELD

Embodiments described herein relate generally to perpendicular magnetic recording media.

BACKGROUND

In technical fields of forming contact holes in, for example, hard disk media, anti-reflective films, catalysts, microchips, optical devices and semiconductors, projection-and-recess processing of a fine pattern on a surface is carried out.

As the recording density of the magnetic recording devices increases, patterned media (BPM (Bit Patterned Media)) is proposed as magnetic recording media for achieving a high recording density. By processing the surface of the recording layer of a hard disk medium into fine projections and recesses, a patterned media can be obtained. In a patterned medium, it is important as to how to form a projection-and-recess pattern. It is conventionally known that a self-assembled process can be employed for the formation of periodical projections and recesses.

A self-assembled lithography using diblock copolymer is a method which can form fine patterns of several nanometers to several tens of nanometers at low cost by utilizing a micro-phase separation structure (lamellar, cylindrical or spherical structure or the like), which is formed by subjecting the diblock copolymer to thermal annealing.

However, as the size of patterns is reduced, the uniformity of patterns is deteriorated in the lift-off process of fine patterns, and therefore the head-disk interface (HDI) characteristics are degraded in the magnetic recording media in some cases.

BRIEF DESCRIPTION OF THE DRAWINGS

FIG. 1 is an explanatory diagram illustrating a contact angle made by a tangential line to an edge portion of a surface of a projecting portion with respect to a surface of a grain boundary layer;

FIG. 2A is a diagram showing a manufacturing process of an example of a perpendicular magnetic recording medium according to embodiments;

FIG. 2B is a diagram showing another manufacturing step of the example of the perpendicular magnetic recording medium according to the embodiments;

DETAILED DESCRIPTION

Figure 2C:
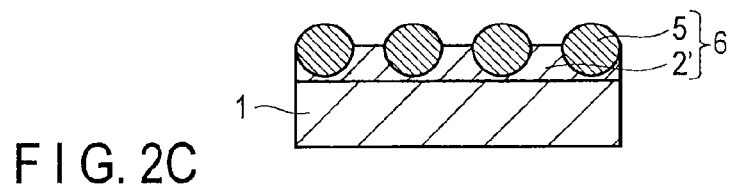
FIG. 2C is a diagram showing still another manufacturing step of the example of the perpendicular magnetic recording medium according to the embodiments.
Figure 2D:
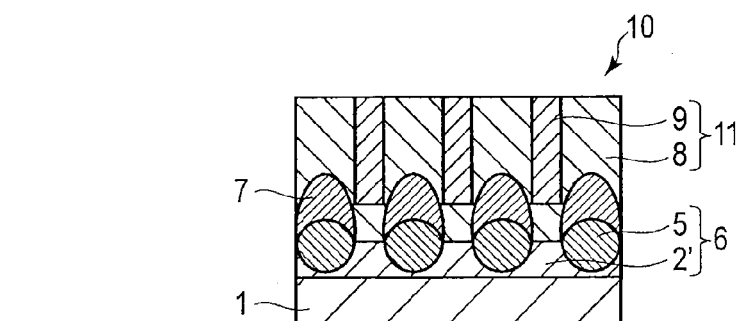
FIG. 2D is a diagram showing still another manufacturing step of the example of the perpendicular magnetic recording medium according to the embodiments.

In general, according to one embodiment, a perpendicular magnetic recording medium includes a substrate, a non-magnetic granular underlayer, a plurality of non-magnetic intermediate layers, and a perpendicular magnetic recording layer. The non-magnetic granular underlayer is configured to comprise a plurality of metal grains of a first metal and a grain boundary layer surrounding the plurality of metal grains, and to be formed on the substrate. The plurality of non-magnetic intermediate layers are configured to be formed respectively on the plurality of metal grains. The perpendicular magnetic recording layer is configured to include magnetic crystal grains formed on the plurality of non-magnetic intermediate layers and a grain boundary region surrounding the magnetic crystal grains.

In a perpendicular magnetic recording medium according to the first embodiment, each of the metal grains comprises a projecting portion projecting from the grain boundary layer and a bottom portion embedded in the grain boundary layer, and the contact angle made by the tangential line to the surface of the edge portion of the projecting portion to the surface of the grain boundary surface is 45° to 85°.

FIG. 1 is an explanatory diagram illustrating the contact angle made by the tangential line to the edge portion of the surface of a projecting portion with respect to the surface of the grain boundary layer.

As shown in the figure, a non-magnetic granular underlayer 6 comprises metal grains 5 and a grain boundary layer 2' provided to surround the metal grains 5. Each of the metal grains 5 comprises a bottom portion 14 embedded in the grain boundary layer 2' and a projecting portion 15 projecting from the surface of the grain boundary layer 2'. A contact angle made by a tangential layer 102 to the surface of the edge portion of the projecting portion 15 and a line 101 along the surface of the grain boundary layer 2' is expressed by α.

In a perpendicular magnetic recording medium according to the second embodiment, a non-magnetic granular underlayer is manufactured in the following manufacturing method.

First, an oxide layer is patterned to form a grain boundary layer with a plurality of recesses.

Next, a non-magnetic metal grain is formed in each of the recesses to obtain a non-magnetic granular underlayer.

For patterning oxide layers, there is one method in which a coating layer containing materials for forming a self-assembled material and an oxide is formed on a substrate, and thereafter, the layer is subjected to phase separation, followed by curing the organic material, or another method in which a mask pattern is formed on an oxide layer formed on a substrate, and the mask pattern is subjected to etching or the like for patterning.

The method which uses a mixture of materials for forming a self-assembled material and an oxide proceeds as follows. That is, first, a solution containing a self-assembled material and an additive component selected from an organic silicon compound or an organic metal compound containing a second metal as a metal compound, is applied on a substrate to form a self-assembled layer. Next, the self-assembled layer is subjected to phase separation to form a sea-island phase including a dispersed phase and a continuous sea polymer phase which surrounds the dispersed phase and contains the material selected from the additive components. Subsequently, the phase-separated self-assembled layer is cured to remove the organic compounds in the self-assembled layer and oxidize the additive component. Thus, a grain boundary layer is formed, which comprises a plurality of recesses in a portion equivalent to the dispersed phase, and the material selected from the silicon oxide or the metal oxide containing the second metal as the metal component in a portion equivalent to the sea polymer phase.

After that, the metal layer of the first metal is formed on the thus obtained grain boundary layer, followed by in situ annealing for reflow. Thus, a fused metal grain is formed on each of the recesses by surface tension, and then the fused metal grain is re-crystallized, thereby obtaining a metal grain of the first metal.

In the metal grain used in the perpendicular magnetic recording medium according to the second embodiment, the projecting portion projecting from the grain boundary layer is formed into a shape which depends on the relationship between the free energy of fused metal and the grain boundary layer, whereas the bottom portion embedded in the grain boundary layer is formed into a shape which depends on the dispersed phase. These shapes are unique ones which can be obtained using the above-described manufacturing method, and therefore, in the second embodiment, the non-magnetic granular underlayer is limited by the manufacturing method.

In the metal grain used in the perpendicular magnetic recording medium according to the second embodiment, the contact angle formed by tangential line of the projecting portion and the surface of the second grain boundary layer can be set to 45° to 85°.

As to the perpendicular magnetic recording media according to the first and second embodiments, a granular layer which comprises such a projecting portion as described above is used as the underlayer. Thus, the separation of the interface between the grain and grain boundary in the granular structure of the vertical magnetic recording layer is improved, and the signal-to-noise ratio in recording and reproduction is enhanced. Therefore, excellent recording reproduction characteristics can be obtained.

Further, according to the second embodiment, a metal layer is formed on an oxide film layer comprising regularly arranged recess patterns, followed by annealing in a vacuum, and thus the underlayer of a granular structure in which the recess patterns are filled with the metal can be manufactured. As the metal layer is re-crystallized with the heat, an energy minimized surface is formed in the surface, thereby making it possible to improve the crystal orientation. Further, due to the relationship between the metal and the oxide layer in wettability, a granular structure in which the metal portion protrudes can be formed. Thus, the crystal orientation can be improved in the intermediate layer and recording layer formed on the non-magnetic granular underlayer, and the separability between grains can be improved.

In the first embodiment, if the contact angle of the surface of the projecting portion with respect to the surface of the second grain boundary layer is less than 45°, there is a tendency that the height between the top of the projecting portion and the surface of the grain boundary layer becomes low. On the other hand, if it exceeds 85°, there is a tendency that it becomes difficult to form an independent metal grain in each of the recesses. This is because it is more stable that the metal which forms the projecting portion aggregate to be large in size on the substrate rather than being embedded in the recess.

The height of the projecting portion can be set to 1 nm to 10 nm.

If the height of the projecting portion is less than 1 nm, there is a tendency that it is difficult to transfer the arrangement pattern formed with the non-magnetic granular layer to the intermediate layer formed on the non-magnetic granular underlayer. On the other hand, if it exceeds 10 nm, there is a tendency that the surface roughness becomes large in the magnetic recording medium in which the magnetic recording layer and protective layer are formed, thus deteriorating the HDI characteristics.

The pitch dispersion of the arrangement of the metal grains on the grain boundary layer is 15% or less, and the dispersion of the grain diameter distribution of the metal grains as seen from above the grain boundary layer can be set to 15% or less.

If the pitch dispersion of the arrangement of the metal grains on the grain boundary layer is more than 15%, or the dispersion of the grain diameter distribution of the metal grains as seen from above the grain boundary layer is more than 15%, the signal-to-noise ratio in recording and reproduction cannot be improved, which results in such a tendency that the component of the jitter noise generated between recording bits becomes large.

The non-magnetic intermediate layer is selected from the group consisting of Ru, Au, Ti, Ta, NiW, Pt, Ag and Cu, or may have such a structure that metal layers containing these metals are stacked one on another. The crystal grains of the non-magnetic intermediate layer can be formed from the surface of the projecting portion by epitaxial growth.

With the non-magnetic intermediate layer, the crystal orientation of the granular recording layer can be enhanced. As the non-magnetic intermediate layer is epitaxially grown from the non-magnetic granular underlayer, the non-magnetic intermediate layer can be formed without deteriorating the pitch dispersion. Further, the crystal orientation of the intermediate layer can be enhanced. Furthermore, by the epitaxial growth, the separation between the grain and grain boundary in the granular recording layer can be improved, and thus the signal-to-noise ratio in high-density recording can be improved.

As the first metal used for the metal grains, at least one type selected from the group consisting of Al, Cu, Ag, Au and Pt can be employed.

With use of a metal of Face-centered cubic (fcc) metal structure or Hexagonal close-packed (hcp) metal structure as the non-magnetic granular underlayer, the projecting portion can be formed into a trapezoidal structure which has a flat top. With a trapezoidal structure, the growth direction of the intermediate layer formed during the epitaxial growth can be controlled.

As the second metal used for the metal oxide, at least one type selected from the group consisting of Si, Ti and Al can be employed.

In the non-magnetic granular underlayer, the grain boundary layer can have a thickness of at least 1 nm.

If the thickness of the grain boundary layer is less than 1 nm, the intermediate layer formed on the grain boundary layer cannot be separated, and thus adjacent crystal grains of the intermediate layer bind to each other. Thus, there is a tendency that the grain diameter dispersion of the intermediate layer deteriorates. Further, the grain boundary layer can be made 10 nm or less. If it exceeds 10 nm, there is a tendency that the intermediate layer is formed by crystal growth even from the flat oxide surface of the non-magnetic granular underlayer.

Regarding the Self-Assembled Material:

As the material for forming the pattern of the non-magnetic granular underlayer, a block copolymer or the like, which expresses a micro-phase separation structure by the anneal process can be employed.

As the block copolymer which expresses a micro-phase separation structure, a diblock copolymer can be employed.

Examples of the diblock copolymer which expresses a micro-phase separation structure are polybutadiene- block-polydimethylsiloxane, polybutadiene-block-poly4vinylpyridine, polybutadiene- block-polymethylmethacrylate, polybutadiene- block-poly-t-butylmethacrylate, polybutadiene- block-poly-t-butylacrylate, polymethylmethacrylate- block-polyethyleneoxide, polybutadiene- block-sodium polyacrylate, polybutadiene-block- polyethyleneoxide, polyethylene- polyethyleneoxide, poly-t- butylmethacrylate-block- poly4vinylpyridine, polyethylene- block-polymethylmethacrylate, poly-t- butylmethacrylate-block-poly2 vinylpyridine, polyethylene-block- poly2vinylpyridine, polyethylene-block-poly4vinylpyridine, polyisoprene-block- poly2vinylpyridine, poly-t-butylmethacrylate-block-polystyrene, polymethacrylate-block-polystyrene, polybutadiene-block-polystyrene, polyisoprene-block-polystyrene, polystyrenepoly-block-poly2vinylpyridine, polystyrene-block- poly4vinylpyridine, polystyrene-block-polydimethylsiloxane, polystyrene-block-poly-N,N-dimethylacrylamide, polystyrene-block-polyethylneoxide, polystyrene-block-polysilsesquioxane, polymethacrylate-block-polysilsesquioxane, polystyrene-block-polymethylmethacrylate, poly-t-butylmethacrylate-block-polyethyleneoxide and polystyrene-block-polyacrylate.

In particular, polystyrene-block-polyethylneoxide, polyethylene-block-polyethylneoxide, polybutadiene-block-polyethylneoxide, poly-t-butylmethacrylate-block-polyethyleneoxide and polymethylmethacrylate-block-polyethyleneoxide, which contain polyethyleneoxide with a high polarity, are compatible with organic materials with polarities, including organic or inorganic glass such as hydrogensilsesquioxane or spin on glass (SOG), and metal salt.

Regarding Pattern Transfer from Self-Assembled Material to Oxide Layer:

For manufacturing an oxide pattern layer as the grain boundary layer which constitutes the non-magnetic granular underlayer, there is an etching method in which an oxide layer is subjected to etching with a self-assembled material as a mask, and there is also a curing method in which a self-assembled material in which a material for forming an oxide is mixed is annealed to a high temperature of 300° C. or higher to sublime the organic components and leave the inorganic components, and the inorganic components are subjected to a crosslinking reaction, thereby forming an oxide pattern.

For the method of transferring a pattern to an oxide layer by etching, the material of the oxide layer is not particularly limited. Further, as to the material for forming patterns, a mask of fine particles or imprint can be used in addition to the diblock copolymers listed above.

For manufacturing an oxide pattern layer of about 10 nm, the curing method is better since it can inhibit the change of the pattern shape, caused by the etching. Here, when forming the oxide pattern layer by the curing, the effect of impurities created during the reflow can be inhibited by carrying out the curing at a temperature equal to or higher than the temperature of the reflow step, which will be later explained.

When forming the oxide pattern layer by the curing, a diblock copolymer containing polyethylene oxide can be utilized, such as polystyrene-block-polyethylneoxide, polyethylene-block-polyethylneoxide, polybutadiene-block-polyethylneoxide, poly-t-butylmethacrylate-block-polyethyleneoxide and polymethylmethacrylate-block-polyethyleneoxide. These listed diblock copolymers are only examples, and copolymers containing high polymers with high polarities, such as polyethyleneoxide, can exhibit similar effects. The examples are not limited to the diblock copolymers, but triblock copolymers can be used as well.

It suffices if the material for the oxide layer formed by the curing is an oxide of Si, Al, Mg, Cr, Ti or Mn, and an organic metal having a high polarity and bonding to polyethylene oxide via hydrogen bond can be used. More specifically, in the case of Si, hydrogen silsesquioxane, SOG or the like can be used. In the case of Al, sodium bis(2-methoxyethoxy) aluminum hydride or the like can be used. Further, in the cases of Mg, Cr, Ti, Mn and the like, complexes containing these metals can be used.

Regarding Metal Film Reflow Step:

As the metal used for the metal grains of the non-magnetic granular underlayer, a material which has a high surface free energy and grows in an island-like manner on an oxide can be selected.

Examples of the metal are Al, Cu, Ag, Au and Pt. These metals each have a high surface energy and easily grow in an island-like manner on an oxide layer regardless of the film forming method. Also, these metals each have an fcc structure, and the energy minimized surface (111) is easily formed on the surface by heat. From the view point crystal growth with the intermediate layer formed on the non-magnetic granular layer, which serves as the underlayer, these metals can be used for the metal layer which forms the non-magnetic granular layer. Al, Ag and Au have low melting points, and therefore they are better for use in the embodiments and highly adaptable to the manufacturing process.

As a method for forming the metal layer of the non-magnetic granular underlayer, the metal layer is formed to have a thickness of 1 nm to 5 nm on the oxide pattern layer, and thereafter annealed in a vacuum, thereby filling the recesses with the metal. Thus, the metal layer can be formed. In this formation, the annealing temperature depends on the melting point of the metal employed, and more specifically, for Al, which has a low melting point of those of the above-listed metals, the annealing is carried out at about 400° C., whereas, for Ag and Au, about 500° C., for Cu, about 700° C., and for Pt, about 800° C., thus making it possible to fill the recess pattern formed of the oxide with the respective metal.

The thickness of the layer formed depends on the pattern pitch of the recess pattern layer, and more specifically, when the pitch is about 10 nm, a film of about 1 nm needs to be formed and then annealed, whereas, for a pitch of about 30 nm, a film of about 3 nm needs to be formed and then annealed. In this manner, the metal layer can be formed in the recess pattern. When a metal layer is formed to have a thickness of 1 nm on an oxide recess pattern layer having a pitch of 30 nm, followed by annealing, the metal layer aggregates only in the edge of the recess pattern. In the case where the metal layer is less in amount as compared to the size of the pattern, an additional film of a necessary thickness may be formed, followed by annealing. Thus, the metal shortage region of the recess pattern can be complemented. On the other hand, when a metal layer is formed to have a thickness of 3 nm on an oxide underlayer having a pattern pitch of 10 nm, followed by annealing, an aggregated island-like metal portion having a pitch of 20 nm to 30 nm is formed regardless of the pattern of the underlayer. In the case where the pitch of the recess pattern is wide and the film formed is thick, the pattern is formed by aggregation regardless of the recess pattern of the oxide if a thick film is formed at once and heated. In order to solve this drawback, the film should be formed thin, and the step of the formation of film and heating is carried out several times, thus solving the drawback of the aggregation. Also, as to the thickness of the film thus formed, its excellent value may change depending on the pattern aspect of the recess pattern. Therefore, the thickness of the metal film to be formed can be changed appropriately according to the recess pattern shape of the underlayer.

Regarding Height of Top of Projection and Angle after Reflow:

The height between the top of the metal portion and the surface of the grain boundary layer formed after the reflow may change depending on the recess pattern size of the underlayer, the thickness of the film formed, and the material. As a condition necessary for the reflow, the angle of the metal filed formed on the portion of the oxide where no pattern is formed, with respect to the surface of the oxide needs to be 85° or less. When larger than 85°, it will be more stable if the metal is largely aggregated on the substrate rather than being embedded into the recess pattern. Further, even if the film is formed thin, an aggregated pattern is formed, which makes it impossible to induce the reflow phenomenon in which the recess pattern is embedded by heating.

For this reason, as to the height of the top of the projection after the reflow, the projections and recesses can only be formed up to about the radius of the recess pattern. Therefore, when the recess pattern has a diameter of 10 nm, the height is about 5 nm at maximum, or when the recess pattern has a diameter of 5 nm, the height is about 2 nm at maximum.

Further, the height may vary due to the material to be embedded, and when the angle made with respect to the oxide layer is small, the height becomes even smaller. But, it is required that the non-magnetic granular underlayer formed by the reflow should serve to control the intermediate layer formed thereon, and therefore the height can be set to about 1 nm.

The height may change due to the thickness of the metal layer formed. In the case where the film is formed to have a thickness equal to or larger than the thickness sufficient to fill the recess pattern in total, the metal overflows from the recess pattern, which results in forming of a pattern having a size equal to or larger than the diameter of the recess pattern. In this manner, the height can be made equal to or larger than the diameter of the recess pattern. But with this manner, there rises a drawback in which the region of the insulation layer, which serves to separate adjacent patters, is reduced.

In the embodiments, as the substrate, a glass substrate, an Al-based alloy substrate, ceramics, carbon, an Si monocrystalline substrate having a oxidized surface and the like can be employed. In particular, a glass substrate, ceramics, an Si monocrystalline substrate having a oxidized surface or the like, which does not, for example, deform or alter its properties even at an annealing temperature of 400° C. or higher, can be used.

In the meantime, as the magnetic crystalline grain material for the granular film-type perpendicular magnetic recording layer used in the embodiments, an alloy material having an hcp structure, which is substantially (001)-face oriented and contains Co and Pt, can be employed. When the Co-alloy crystal grains having the hcp structure is (001)-face oriented, the easy axis of magnetization is oriented in a vertical direction with respect to the surface of the substrate, and thus there is a tendency that the layer exhibits a perpendicular magnetic anisotropy. Alternatively, an alloy of, for example, Co—Pt or Co—Pt—Cr-based material can be used. These alloys each have a high crystal magnetic anisotropic energy, and therefore they have high anti-thermal fluctuations. For improving the magnetic properties, additional elements such as Ta, Cu, B and Nd can be added as needed.

In the meantime, as the non-magnetic grain boundary region material of the granular film-type recording layer, an oxide of Si, Cr, Ti or the like can be used. These oxides do not substantially make solid solution with the above-described Co—Pt alloy, and therefore they easily precipitate in the crystal grain boundary between magnetic crystal grains. Thus, a granular structure can be obtained relatively easily. The material which forms the grain boundary region may be crystalline or amorphous.

The total rate in the amounts of the substances of the above-described material which forms the grain boundary region can be set in a range of 5 to 15% in molar. When it is less than 5 mole %, it becomes difficult to maintain the granular structure, whereas when exceeding 20 mole %, there is a tendency that the reproduction output in the R/W characteristics is lowered. The total rate can be set in a range of 7 to 12% in molar.

In the embodiments, a soft magnetic layer having a high magnetic permeability can be provided between the substrate and the non-magnetic granular layer. The soft magnetic layer carries out a part of the function of the magnetic head configured to magnetize the perpendicular magnetic recording layer, which allows a recording magnetic field from the magnetic head, for example, to pass in a horizontal direction and convect towards the magnetic head. Thus, the soft magnetic layer can serve to apply a steep and sufficient perpendicular magnetic field to the recording layer for the magnetic field, thereby improving the recording-reproduction efficiency.

Examples of such a soft magnetic layer are CoZrNb, CoB, CoTaZr, FeSiAl, FeTaC, CoTaC, NiFe, Fe, FeCoB, FeCoN and FeTaN.

The soft magnetic layer may be a multilayered film of two or more layers. In this case, these layers may be different from each other in material, composition and thickness. Further, it may be a three-layered structure in which two soft magnetic layers are stacked one on another while interposing a thin Ru layer therebetween.

For the purpose of improving the mechanical tightness between the substrate and the soft magnetic layer, a non-magnetic tight layer can be provided between the substrate and the soft magnetic layer. Examples of the non-magnetic tight layer are Cr and Ti, or alloys of these materials.

A diffusion preventing layer can be formed between the soft magnetic layer and the non-magnetic granular layer used in the embodiments. Examples of the diffusion preventing layer are Pd, Pt and Si.

A crystal orientation controlling layer can be provided between the soft magnetic layer and the non-magnetic granular layer used in the embodiments. When the diffusion preventing layer is formed, the crystal orientation controlling layer can be provided between the diffusion preventing layer and the non-magnetic granular layer.

Examples of the crystal orientation controlling layer are NiW, NiTa, Ti, Ta, W, Cu, Pd, Pt, Cr, Au and Ag.

The embodiments will now be described with reference to drawings.

Example 1

FIGS. 2A to 2E are schematic diagram showing the operations of the pattern forming method according to the embodiments.

A soft magnetic layer (CoZrNb) having a thickness of 40 nm, not shown, was formed on a glass substrate 1, and then a Pd layer, not shown, was formed to have a thickness of 3 nm for the prevention of diffusion. The substrate 1 was once exposed to the atmosphere, and then a solution containing a self-assembled material PS-PEO and SOG (Spin on glass) as the additive component, was applied on the substrate 1 by the spin coating method. Thus, a self-assembled layer 4 was formed. The PS-PEO used here was a copolymer having a molecular weight of PS of 1,600 Mn and a molecular weight of PEO of 1,800 Mn, and the SOG was OCD T-7 4000-T of Tokyo Ohka Kogyo Co., Ltd. The PS-PEO and SOG were dissolved and diluted into diethylene glycol dimethyl ether (Diglyme) to have a concentration of 1.0% by mass and a concentration of 10.0% by mass, respectively, and the solutions diluted with Diglyme were mixed together at a weight ratio of 1:6, thus obtaining a solution for the self-organization. In place of SOG, silsesquioxane can be obtained to obtain similar results.

After the self-assembled film was applied on the substrate, the sample was let stand for 5 hours in an atmosphere of chloroform and octane, thus inducing the phase separation of the self-assembled layer 4. In this manner, a sea-island phase comprising an dispersed phase 3 of PS and a continuous sea polymer phase 2 surrounding the dispersed phase 3 and comprising PEO containing SOG was formed as shown in FIG. 2A. The sample may be let stand for 20 hours in the atmosphere at room temperature for promotion of the self-assembly.

After that, the substrate was heated to 500° C. in a nitrogen atmosphere and thus the PS and PEO, which are organic materials, decomposed to make portions corresponding to the dispersed phase into recesses, whereas a recess pattern of SOG was formed as a grain boundary layer with a plurality of recesses at a portion corresponding to the sea polymer phase.

Thus, the scanning electron microscope (SEM) planer surface of the thus obtained medium was measured, and the grain diameter and pitch were analyzed in the following procedure.

First, an image of a magnification of 500,000 times of the medium was processed using any image processing software application, to extract the outline of each individual grain. After that, the thus obtained information on each outline was subjected to approximation with an ellipse to calculate the area and diameter of each grain, and thus the dispersion in grain size was calculated.

Further, the barycentric coordinates of the grains were read out and minimum triangles (Delaunay triangles) composed of the grains were drawn, thus calculating the pitch between the grains. This recess pattern was observed by means of the planner TEM, and it was found that a recess pattern having a grain diameter of 7 nm, a pitch of 12 nm and both of a grain diameter dispersion and pitch dispersion of 8% or less, was formed. Also from the cross-sectional TEM observation, it was found that the recess pattern formed on the substrate 1 comprises a plurality of recesses 21 at portions corresponding to the dispersed phase on a SOG layer 2' as shown in FIG. 2B. The size of the pattern formed by the self-assembly can be controlled arbitrarily by adjusting the molecular weights of the PS-PEO and SOG which give rise to the template, and the mixture ratio of these appropriately.

After that, the sample was returned into the film forming chamber, and subjected to reverse sputtering in an Ar atmosphere at a gaseous pressure of 0.6 Pa, thus etching the thin film side. This process has an effect of removing impurities such as molecules and atoms considered to attach, while taking these forms, to the surface of the SOG layer by being exposed once to the atmosphere.

An Ag film was formed to have a thickness of 1.2 nm on the obtained SOG layer 2', and then heated at about 500° C. for 20 seconds to embed Ag grains into the plurality of recesses 21 and also re-crystallize Ag grains. A portion of the medium thus obtained was taken out, and the shape of the surface thereof was measured with an AFM. Here, it was found that, as shown in FIG. 2C, an Ag grain 5 was embedded in each region which was before a recess pattern of SOG, and each region has a configuration projecting with respect to the surface of the SOG layer. It was also found that the height of the projecting portion 15 was about 3 nm. Further, the substrate 1 was observed by a cross-sectional TEM. It was found here that the depth to the bottom 14 thereof was 4 nm, and the contact angle made by the tangential line of the edge portion of the projecting portion formed of the Ag grain 5 with respect to the surface of the SOG layer 2' was measured to be about 75°.

An Ru film of an intermediate layer 7 was formed to have a thick of 10 nm in an Ar atmosphere at a pressure of 0.4 Pa on the substrate in which Ag was embedded in the recess pattern by heating in a vacuum. This film forming process is carried out continuously from the embedding of Ag by heating in the vacuum without exposing to the atmosphere to prevent contamination by impurities. Then, an RF sputtering was carried out continuously on the intermediate layer 7 thus formed in an Ar atmosphere at a pressure of 0.6 Pa using a composite target of (Co-16 at. % Pt-10 at. % Cr)-8 mol % $SiO_2$. Thus, a perpendicular magnetic recording layer 11 of CoPtCr—$SiO_2$ having a thickness of 15 nm was formed, which comprises magnetic crystal grains 8 containing CoPtCr and a grain boundary region 9 containing $SiO_2$ and surrounding the grains. After that, a C-protective film 12 having a thickness of 5 nm was formed thereon, thereby obtaining a perpendicular magnetic recording medium 10.

Figure 2E:
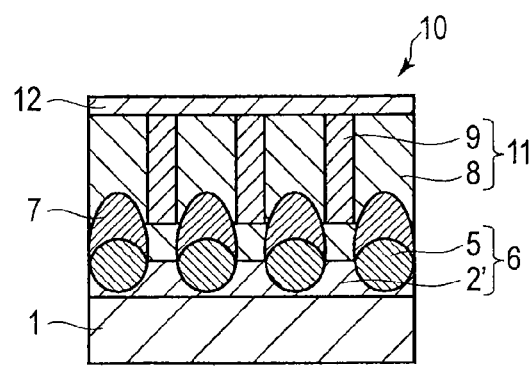
FIG. 2E is a diagram showing still another manufacturing step of the example of the perpendicular magnetic recording medium according to the embodiments.

The magnetic recording medium thus obtained was observed by means of a cross-sectional transmission electron microscope (TEM), and it was found that it had a cross-sectional structure as schematically shown in FIG. 2E. As shown in FIG. 2E, it was also found that in a cross section of the granular layer, Ru, which would give a rise to the intermediate layer 7, grew on Ag grains each as a nucleus, which were separated by the amorphous SOG serving as an intergranular material. Further, it was confirmed how the magnetic crystal grains 8 separated by the grain boundary region 9, which does not exhibit a crystallinity, epitaxially grew continuously from the Ru intermediate layer 7 in the perpendicular magnetic recording layer 11.

The perpendicular magnetic recording layer 11 was subjected to a planner TEM observation to calculate the grain diameter distribution within the film surface and the distribution of pitches between grains. The average grain size was 7.5 nm, and its standard deviation was 0.6 nm, whereas the average pitch between the grains was 12.5 nm, and its standard deviation was 1.4 nm. Here, from the foundation of the pattern of the self-assembled layer used for the underlayer, the formation of the layers can be carried out up to the recording layer. Thus, the perpendicular magnetic recording layer can be formed without deteriorating the dispersion from the underlying template.

With regard to the perpendicular magnetic recording medium thus manufactured, the recording and reproduction characteristics were evaluated with Read-Write Analyzer 1632, a product of GUZIK of the U.S.A and Spin Stand S1701MP. In this evaluation, a magnetic monopolar head having a saturation magnetic flux density of about 2 T in its recording section was used, whereas as the reproduction element, a head which utilizes the giant magneto-resistance effect was used. In the evaluation of the ratio of the reproduction signal output to medium noise (S/Nm), as the reproduction signal output S, the amplitude at a linear recording density of about 50 kFCI was used, whereas as Nm, the root-mean-square value at a linear recording density of about 400 kFCI was used. According to the results, no spike-like noise was observed in front of the disk, but such an excellent value, an S/Nm of 19.5 dB, was obtained. Further, a signal of a linear recording density of about 100 kFCI was recorded on the recording medium, and the output degradation caused by thermal fluctuation was evaluated. The reproduction output was measured periodically for 100,000 seconds after the finishing of the recording operation, but the degradation of the reproduction output was within a range of the measurement error and the signal attenuation factor was substantially −0 dB/decade.

Example 2

Example 2 will be described in connection with the case where Al—AlO was used as the non-magnetic granular underlayer.

The self-assembled material used for the substrate and patterning was similar to that of Example 1.

As in Example 1, a soft magnetic layer (CoZrNb), not shown, was formed to have a thickness of 40 nm on a glass substrate, and then a Pd layer having a thickness of 3 nm was formed thereon for the prevention of diffusion. The substrate is once exposed to the atmosphere. Here, a self-assembled material PS-PEO was used, and also as the material for forming an oxide by curing, sodium bis(2-methoxyethoxy)aluminum hydride was used. These solutes were dissolved into toluene, and the solutions were mixed together at such a mixture ratio that the phase separation of an dispersed phase of PS and a sea polymer phase of PEO and sodium bis(2-methoxyethoxy)aluminum hydride occurs. In this manner, a self-assembled layer was formed on the substrate.

After that, it was let stand for 20 hours in the atmosphere, thus inducing the phase separation, and the substrate was heated to 400° C. in a nitrogen atmosphere. Thus, the PS and PEO, which are organic materials, decomposed to form an oxide pattern layer of AlO as the grain boundary layer with a plurality of recesses at portions corresponding to the dispersed phase.

When surface of the medium thus obtained was observed by means of the planner SEM to analyze the grain diameter and pitch as in Example 1. Here, it was found that the grain diameter was 7 nm, the pitch was 12 nm and both of the grain diameter dispersion and pitch dispersion were 9% or less, and thus a recess pattern similar to that of Example 1 was formed. The size of the pattern formed by the self-organization can be controlled arbitrarily by adjusting the molecular weights of the PS-PEO and sodium bis(2-methoxyethoxy)aluminum hydride, which give rise to the template, and the mixture ratio of these appropriately.

After forming the AlO pattern layer, the sample was returned into the film forming chamber, and subjected to reverse sputtering in an Ar atmosphere at a gaseous pressure of 0.6 Pa, thus etching the thin film side. This process has an effect of removing molecules, atoms and the like considered to have attached, while taking these forms, to the surface of the thin film by being exposed once to the atmosphere.

An Al film was formed to have a thickness of 1.2 nm on the AlO pattern layer, and then heated at about 400° C. for 20 seconds to embed Al into the recesses of the AlO pattern layer and also re-crystallize Al. A portion of the medium thus obtained was taken out, and the shape of the surface thereof was measured with an AFM. Here, it was found that Al was embedded in each region which was before a recess of the AlO pattern layer, and each region has a configuration projecting with respect to the surface of the AlO pattern layer. It was also found that the height of the projecting portion was about 2 nm. Further, the substrate was observed by a cross-sectional TEM. It was found here that the depth to the bottom thereof was 4 nm, and the (111) face was oriented in a perpendicular direction. From the cross-sectional TEM, the contact angle made by the tangential line of the edge portion of the projecting portion with respect to the surface of the AlO pattern layer was measured to be about 55°.

An Ru film of an intermediate layer was formed to have a thick of 10 nm in an Ar atmosphere at a pressure of 0.4 Pa on the substrate in which Al was embedded in the recess pattern by heating in a vacuum. Then, an RF sputtering was carried out continuously in the film forming chamber on the Ru intermediate layer in an Ar atmosphere at a pressure of 0.6 Pa using a composite target of (Co-16 at. % Pt-10 at. % Cr)-8 mol % $SiO_2$. Thus, a perpendicular magnetic recording layer of CoPtCr—$SiO_2$ having a thickness of 15 nm was formed. After that, a C-protective film having a thickness of 5 nm was formed thereon, thereby obtaining a perpendicular magnetic recording medium.

Figure 3:
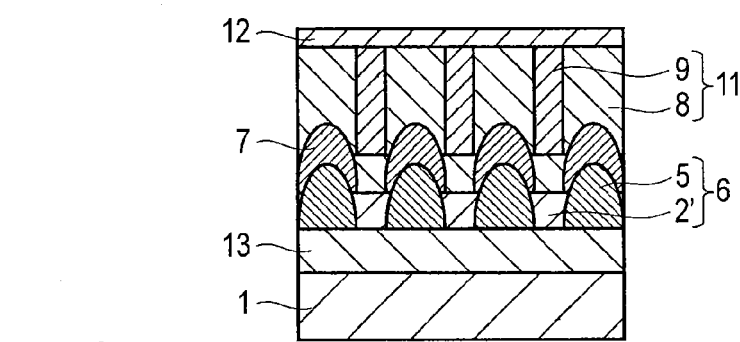
FIG. 3 is a diagram showing another example of the perpendicular magnetic recording medium according to the embodiments.

The magnetic recording medium thus obtained was observed by means of a cross-sectional (TEM), and it was found that it had a cross-sectional structure as schematically shown in FIG. 3 as in the case of Example 1. Further, it was confirmed how the magnetic crystal grains separated by the grain boundary region, which does not exhibit a crystallinity, epitaxially grew continuously from the Ru layer in the perpendicular magnetic recording layer.

The perpendicular magnetic recording layer was subjected to a planner TEM observation to calculate the grain diameter distribution within the film surface and the distribution in the pitch between grains. The average grain size was 7.6 nm, and its standard deviation was 0.8 nm, whereas the average pitch between the grains was 12.8 nm, and its standard deviation was 1.8 nm.

With regard to the perpendicular magnetic recording medium thus manufactured, an evaluation in S/Nm was carried out in a similar manner to that of Example 1. According to the results, no spike-like noise was observed in front of the disk, but such an excellent value, an S/Nm of 19.0 dB, was obtained. Further, a signal of a linear recording density of about 100 kFCI was recorded on the recording medium, and the output degradation caused by thermal fluctuation was evaluated. The reproduction output was measured periodically for 100,000 seconds after the finishing of the recording operation, but the degradation of the reproduction output was within a range of the measurement error and the signal attenuation factor was substantially −0 dB/decade. The factor for the characteristics being slightly degraded as compared to the results of Example 1 is that the height of the top of the projection was 2 nm, which was lower than that of Example 1, due to a smaller contact angle of 55° made between the Al grain formed by the reflow and the AlO layer.

Example 3

Example 3 will be described in connection with the case where Pt, which has a high melting point, was used as the metallic material for forming the non-magnetic granular underlayer.

This example is similar to Example 1 except that Pt was used for the non-magnetic granular underlayer serving as the base.

As in Example 1, a soft magnetic layer (CoZrNb) was formed to have a thickness of 40 nm on a glass substrate, and then a Pd layer having a thickness of 3 nm was formed thereon for the prevention of diffusion. The substrate was once exposed to the atmosphere and then a solution containing a self-assembled material PS-PEO and SOG was applied by the spin coating method to form a self-assembled film. The PS-PEO and SOG used here are similar to those of Example 1.

After the self-assembled film was applied on the substrate, the sample was let stand for 5 hours in an atmosphere of chloroform and octane, thus inducing the phase separation of the self-assembled material. Then, the substrate was heated to 800° C. in a nitrogen atmosphere and thus the PS and PEO, which are organic materials, decomposed to form a recess pattern of SOG similar to that of Example 1, on the substrate.

After that, the sample was returned into the film forming chamber, and subjected to reverse sputtering in an Ar atmosphere at a gaseous pressure of 0.6 Pa, thus etching the thin film side as in Example 1. After that, a Pt film was formed to have a thickness of about 1.2 nm on the recess pattern of SOG, and then heated at about 800° C. for 4 hours to embed Pt into the recess pattern and also to re-crystallize Pt. A portion of the medium thus obtained was taken out, and the shape of the surface thereof was measured with an AFM. Here, it was found that Pt was embedded in a region which was before the recess pattern of SOG, and the region has a projecting configuration. It was also found that the height of the projecting portion was about 3 nm. Further, the substrate was observed by a cross-sectional TEM. It was found here that the depth to the bottom thereof was 4 nm, and the angle made by the edge portion of the projecting portion formed of Pt with respect to the surface of the SOG was measured to be about 80°.

An Ru film of an intermediate layer was formed to have a thick of 10 nm in an Ar atmosphere at a pressure of 0.4 Pa on the substrate in which Pt was embedded in the recess pattern by heating in a vacuum. Then, an RF sputtering was carried out continuously in the film forming chamber on the Ru intermediate layer in an Ar atmosphere at a gas pressure of 0.6 Pa using a composite target of (Co-16 at. % Pt-10 at. % Cr)-8 mol % $SiO_2$. Thus, a perpendicular magnetic recording layer of CoPtCr—$SiO_2$ having a thickness of 15 nm was formed. After that, a C-protective film having a thickness of 5 nm was formed thereon, thereby obtaining a perpendicular magnetic recording medium.

The magnetic recording medium thus obtained was observed by means of a cross-sectional (TEM), and it was found that a cross section similar to that of Example 1 was obtained. It was further found that the cross section had a structure as schematically shown in FIG. 2E.

As shown in the figure, it was made clear that in a cross section of the granular layer, Ru of the intermediate layer grew on Pt grains each as a nucleus, which were separated by the amorphous SOG serving as an intergranular material. Further, it was confirmed how the magnetic crystal grains separated by the grain boundary, which does not exhibit a crystallinity, epitaxially grew continuously from the Ru intermediate layer in the perpendicular magnetic recording layer.

The perpendicular magnetic recording layer was subjected to a planner TEM observation to calculate the grain diameter distribution within the film surface and the distribution of pitches between grains. The average grain size was 7.5 nm, and its standard deviation was 0.9 nm, whereas the average pitch between the grains was 12.5 nm, and its standard deviation was 2.0 nm. A factor for the standard deviation being slightly degraded is considered that the recess pattern was not sufficiently filled due to the high melting point of Pt.

With regard to the perpendicular magnetic recording medium thus manufactured, an evaluation in S/Nm was carried out in a similar manner to that of Example 1. According to the results, no spike-like noise was observed in front of the disk, but such an excellent value, an S/Nm of 17.4 dB, was obtained. Further, a signal of a linear recording density of about 100 kFCI was recorded on the recording medium, and the output degradation caused by thermal fluctuation was evaluated. The reproduction output was measured periodically for 100,000 seconds after the finishing of the recording operation, but the degradation of the reproduction output was within a range of the measurement error and the signal attenuation factor was substantially −0 dB/decade.

Example 4

Example 4 will be described in connection with the case where a crystal orientation controlling layer (NiW) is inserted in the base of the non-magnetic granular underlayer.

A soft magnetic layer (CoZrNb) was formed to have a thickness of 40 nm on a glass substrate. Then, a Pd layer having a thickness of 3 nm was formed thereon for the prevention of diffusion and further a NiW film having a thickness of 5 nm was formed as the crystal orientation controlling layer. The substrate was once exposed to the atmosphere and then a solution containing a self-assembled material PS-PEO and SOG was applied by spin coating to form a self-assembled film. The PS-PEO used here was similar to that of Example 1. On the other hand, in place of SOG, silsesquioxane was used in this example at a ratio of 30% with respect to PS-PEO, and the solution was adjusted such that PS would form a cylindrical structure, which gives rise to a columnar shape. Note that even in the case where SOG is used as in Example 1 in place of silsesquioxane, a similar result can be obtained by changing the ratio of SOG.

After a self-assembled film was applied to have a thickness of 10 nm on the substrate, and then the sample was let stand for 5 hours in an atmosphere of chloroform and octane, thus inducing the phase separation of the self-assembled material. Then, the substrate was heated to 500° C. in a nitrogen atmosphere and thus the PS and PEO, which are organic materials, decomposed to form a recess pattern made of an oxide in which silsesquioxane underwent a cross-linking reaction, on the substrate.

This recess pattern was observed by means of the planner TEM, and it was found that a recess pattern having a grain diameter of 7 nm, a pitch of 12 nm and both of a grain diameter dispersion and pitch dispersion of 8% or less, was formed. Also from the cross-sectional TEM observation, it was found that the recess pattern formed to pierce through the oxide layer and reach even the NiW layer underneath. The size of the pattern formed by the self-organization can be controlled arbitrarily by adjusting the molecular weights of the PS-PEO and silsesquioxane which give rise to the template, appropriately.

After that, the sample was returned into the film forming chamber, and subjected to reverse sputtering (sputtering the thin film side) in an Ar atmosphere at a gaseous pressure of 0.6 Pa. This process has an effect of removing impurities such as films, atoms and the like, considered to attach, while taking these forms, to the surface of the thin layer by being exposed once to the atmosphere. Further, with this process, residuals remaining on the bottom portion of the oxide recess pattern formed by heating can be removed, thereby making it possible to obtain a clean surface of the NiW layer. After the reverse sputtering, an Ag film was formed to have a thickness of about 2 nm on the recess pattern of SOG, and then heated at about 500° C. for 20 seconds to embed Ag into the recess pattern and also to re-crystallize Ag. A portion of the medium thus obtained was taken out, and the shape of the surface thereof was measured with an AFM. Here, it was found that the recess pattern was still observed and thus it was not sufficiently embedded. From the observation by a top planner SEM, it was made clear that only about a half of the recess shape was filled.

In order to fill the recess pattern completely, an Ag film was formed to have a thickness of about 2 nm on the SOG pattern, and then annealed at about 500° C. for 20 seconds, and once again an Ag film was formed to have a thickness of about 2 nm thereon and then heated at about 500° C. Then, a portion of the substrate thus re-manufactured was taken out, and the shape of the surface thereof was measured with an AFM. Here, it was found that the region which was before the recess pattern of SOG has a projecting shape and the recess pattern was embedded. It was also found that the height of the projecting shape was about 2 nm. Further, the substrate was observed by a cross-sectional TEM. It was found here that the depth to the bottom thereof was 10 nm, which is the same as the thickness of the film, and the (111) face was oriented in a perpendicular direction.

Subsequently, an Ru film of an intermediate layer was formed to have a thick of 10 nm in an Ar atmosphere at a pressure of 0.4 Pa on the substrate in which Ag was embedded in the recess pattern by heating in a vacuum. Then, a portion of the substrate thus manufactured was taken out, and evaluated by means of the cross sectional TEM. Here, it was found from a lattice fringe image thereof at a high magnification that crystal faces regularly oriented were formed on the NiW underlayer and Ag grains, which demonstrates an epitaxial relationship between NiW and Ag. Further, the portion was subjected to θ-2θ scanning using an XRD, and a diffraction peak was observed in the vicinity of 2θ=38.1°, but no other definite peak was not observed except for the reflection from the substrate. Further, the peak of an Ru (002) face was measured in terms of rocking curve, and it was found that the full width at half maximum $\Delta\theta_{50}$ was 5.4° and an excellent crystalline orientation was obtained.

Next, an RF sputtering was carried out continuously in the film forming chamber on the Ru intermediate layer formed above in an Ar atmosphere at a gas pressure of 0.6 Pa using a composite target of (Co-16 at. % Pt-10 at. % Cr)-8 mol % $SiO_2$. Thus, a perpendicular magnetic recording layer of CoP-tCr—$SiO_2$ having a thickness of 15 nm was formed. After that, a C-protective film having a thickness of 5 nm was formed thereon, thereby obtaining a perpendicular magnetic recording medium.

The magnetic recording medium thus obtained was observed by means of a cross-sectional TEM, and it was found that a cross sectional configuration was roughly as shown in FIG. 3. As shown in FIG. 3, it was made clear that in a cross section of the granular layer, Ag grains separated by the amorphous oxide serving as an intergranular material were able to grow to have a columnar shape in a vertical direction with respect to the substrate, which demonstrate how an epitaxial growth occurred continuously from the NiW underlayer to the Ag grains. Further, it was confirmed how the magnetic crystal grains separated by the grain boundary, which does not exhibit a crystallinity, epitaxially grew continuously from the Ru intermediate layer in the perpendicular magnetic recording layer.

The perpendicular magnetic recording layer was subjected to a planner TEM observation to calculate the grain diameter distribution within the film surface and the distribution of pitches between grains. The average grain size was 7.5 nm, and its standard deviation was 0.6 nm, whereas the average pitch between the grains was 12.5 nm, and its standard deviation was 1.4 nm. From the non-magnetic granular layer, which was used as the base, to the recording layer, they can be formed by the epitaxial growth, and therefore the perpendicular magnetic recording layer can be formed without deteriorating the dispersion from the underlying template.

With regard to the perpendicular magnetic recording medium thus manufactured, an evaluation in S/Nm was carried out in a similar manner to that of Example 1. According to the results, no spike-like noise was observed in front of the disk, but such an excellent value, an S/Nm of 22.1 dB, was obtained. This is considered to be because, from the crystal orientation controlling layer to the recording layer, they can be formed by the epitaxial growth, which results in an excellent crystalline orientation. Further, a signal of a linear recording density of about 100 kFCI was recorded on the recording medium, and the output degradation caused by thermal fluctuation was evaluated. The reproduction output was measured periodically for 100,000 seconds after the finishing of the recording operation, but the degradation of the reproduction output was within a range of the measurement error and the signal attenuation factor was substantially –0 dB/decade.

Comparative Example 1

Comparative Example 1 will now be described in connection with the case where the non-magnetic granular underlayer was formed of an insulating material and metal fine grains.

A soft magnetic layer (CoZrNb) was formed to have a thickness of 40 nm on a glass substrate, and then a Pd layer having a thickness of 3 nm was formed thereon for the prevention of diffusion. Then, a solution containing the following materials was applied on the substrate by the spin coat method, followed by drying, thus forming a non-magnetic granular underlayer. The solution was prepared by dissolving Ag fine grains covered by protection groups of polystyrene together with SOG into toluene. Here, the SOG was dissolved into the toluene such that the amount thereof dissolved was 80 times as much in mass as that of the Ag fine grains at weight ratio.

The solution was applied by spin coat under such conditions to form a single layer of Ag fine grains and SOG surrounding the fine grains, and then cured at 400° C. for 2 hours to harden the SOG. Thus, the non-magnetic granular underlayer comprising the Ag fine grains and SOG was formed. After that, the SOG was slightly etched by a reactive ion etching using $CF_4$ to expose Ag fine grains on the surface of the non-magnetic granular underlayer. Thus, an underlayer in which the Ag fine grains formed projecting configurations was formed.

The resultant was measured with an AFM, and it was found that the height of the projecting portion of each Ag fine grain was about 3 nm. Further, the observation by a cross-sectional TEM indicated that the depth to the bottom of each Ag fine grain was 4 nm. Further, the shape of the Ag fine grains of Comparative Example 1 was closer to a perfect sphere as compared to the shapes of the Ag fine grains obtained in Examples 1 to 4.

Subsequently, the underlayer thus obtained was returned to the chamber, and an Ru film of an intermediate layer was formed to have a thick of 10 nm in an Ar atmosphere at a pressure of 0.4 Pa. Then, an RF sputtering was carried out continuously in the film forming chamber on the Ru intermediate layer in an Ar atmosphere at a pressure of 0.6 Pa using a composite target of (Co-16 at. % Pt-10 at. % Cr)-8 mol % $SiO_2$. Thus, a perpendicular magnetic recording layer of CoP-tCr—$SiO_2$ having a thickness of 15 nm was formed. After that, a C-protective film having a thickness of 5 nm was formed thereon, thereby obtaining a perpendicular magnetic recording medium.

The magnetic recording medium thus obtained was observed by means of a cross-sectional TEM, and it was confirmed how the Ru intermediate layer grew in a cross section of the granular layer from the Ag grains, as the nuclei, separated by the amorphous SOG serving as the intergranular material. However, at the same time, it was also made clear that a low contrast oxide or fluoride layer was created in an interface between Ag and Ru components, thus disturbing the crystalline orientation of the Ru component. Further, although the crystal grains separated by the grain boundary region, which does not exhibit a crystallinity, were observed to have epitaxially grown continuously from the Ru layer in the perpendicular magnetic recording layer, it was also confirmed that the crystal axis was inclined due to the poor crystalline orientation of the Ru.

The perpendicular magnetic recording layer was subjected to a planner TEM observation to calculate the grain diameter distribution within the film surface and the distribution of pitches between grains. The average grain size was 8.9 nm, and its standard deviation was 1.5 nm, whereas the average pitch between the grains was 10.5 nm, and its standard deviation was 2.1 nm. This is considered because of the following reason. That is, oxides and fluorides were formed in the interface between the Ag fine grains and the Ru intermediate layer due to oxygen and fluorine used in the etching, thereby disturbing the crystalline orientation of the intermediate layer. As a result, the Ru columnar structure was not able to be kept perpendicular to the substrate, and the Ru grains bonded to each other.

The perpendicular magnetic recording medium thus manufactured was evaluated in terms of the recording-reproduction characteristics. The results indicated that the S/Nm was poor as 7.5 dB, which clearly demonstrates that the characteristics were significantly poor as compared to those of the media manufactured in the Examples carried out in a similar manner to that of Example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
   a substrate;
   a non-magnetic granular underlayer formed on the substrate and comprising a plurality of metal grains and a grain boundary layer configured to surround the plurality of metal grains, each of the plurality of metal grains comprising a projecting portion projecting from the grain boundary layer and a bottom portion embedded in and surrounded with the grain boundary layer, and a contact angle made between a surface of the grain boundary layer and a tangential line on an edge of the projecting portion being 45° to 85°;
   a non-magnetic intermediate layer formed on a surface of each projecting portion; and
   a perpendicular magnetic recording layer comprising magnetic crystal grains formed on the non-magnetic intermediate layer and a grain boundary region configured to surround the magnetic crystal grains, wherein
   the grain boundary layer comprises a silicon oxide or a metal oxide.

2. The perpendicular magnetic recording medium of claim 1, wherein a height of the projecting portion is 1 nm to 10 nm.

3. The perpendicular magnetic recording medium of claim 1, wherein a pitch dispersion of arrangement of the plurality of metal grains on the grain boundary layer is 15% or less, and a dispersion of grain diameter distribution of the plurality of metal grains as viewed from above the grain boundary layer is 15% or less.

4. The perpendicular magnetic recording medium of claim 1, wherein the non-magnetic intermediate layer comprises a material selected from the group consisting of ruthenium, tantalum, copper, gold and platinum, and the crystal grains of the non-magnetic intermediate layer epitaxially grow from the surface of the projecting portion.

5. The perpendicular magnetic recording medium of claim 1, wherein a first metal used for the metal grains is at least one type selected from the group consisting of aluminum, copper, silver, gold and platinum.

6. The perpendicular magnetic recording medium of claim 1, wherein a second metal used for the metal oxide is at least one type selected from the group consisting of silicon, titanium and aluminum.

7. A perpendicular magnetic recording medium comprising:
   a substrate;
   a non-magnetic granular underlayer formed on the substrate and comprising a plurality of metal grains and a grain boundary layer configured to surround the plurality of metal grains, each of the plurality of metal grains comprising a projecting portion projecting from the grain boundary layer and a bottom portion embedded in and surrounded with the grain boundary layer,
   the non-magnetic granular underlayer being obtained by:
   applying on the substrate a solution comprising a self-assembled material and an additive component selected from the group consisting of organosilicon compounds and organometallic compounds to form a self-assembled layer,
   subjecting the self-assembled layer to phase separation, thereby forming a sea-island phase comprising a dispersed phase and a continuous sea polymer phase configured to surround the dispersed phase and contain the selected additive component,
   curing the phase-separated self-assembled layer to remove organic components in the self-assembled layer and oxidize the additive component, thereby forming an oxide grain boundary layer comprising a plurality of recesses at portions corresponding to the dispersed phase and a material selected from the group consisting of silicon oxides and metal oxides at a portion corresponding to the sea polymer phase, and
   forming a metal layer on the grain boundary layer and then subjecting the metal layer to reflow, to form metal grains on the plurality of recesses, respectively by surface tension and re-crystallizing the metal grains;
   a non-magnetic intermediate layer formed on a surface of each projecting portion; and
   a perpendicular magnetic recording layer comprising magnetic crystal grains formed on the non-magnetic intermediate layer and a grain boundary region configured to surround the magnetic crystal grains.

8. The perpendicular magnetic recording medium of claim 7, wherein a contact angle made by a tangential line on an edge of the projecting portion with respect to a surface of the grain boundary layer is 45° to 85°.

9. The perpendicular magnetic recording medium of claim 7, wherein a height of the projecting portion is 1 nm to 10 nm.

10. The perpendicular magnetic recording medium of claim 7, wherein a pitch dispersion of arrangement of the metal grains on the grain boundary layer is 15% or less, and a dispersion of grain diameter distribution of the metal grains as viewed from above the grain boundary layer is 15% or less.

11. The perpendicular magnetic recording medium of claim 7, wherein the non-magnetic intermediate layer comprises a material selected from the group consisting of ruthenium, tantalum, copper, gold and platinum, and the crystal grains of the non-magnetic intermediate layer epitaxially grow from the surface of the projecting portion.

12. The perpendicular magnetic recording medium of claim 7, wherein a first metal used for the metal grains is at least one type selected from the group consisting of aluminum, copper, silver, gold and platinum.

13. The perpendicular magnetic recording medium of claim 7, wherein a second metal used for the metal oxides is at least one type selected from the group consisting of silicon, titanium and aluminum.

* * * * *